May 29, 1951    F. L. CLAYTON    2,555,027
QUICK RELEASE ANIMAL HARNESS
Filed Oct. 11, 1948    2 Sheets-Sheet 1
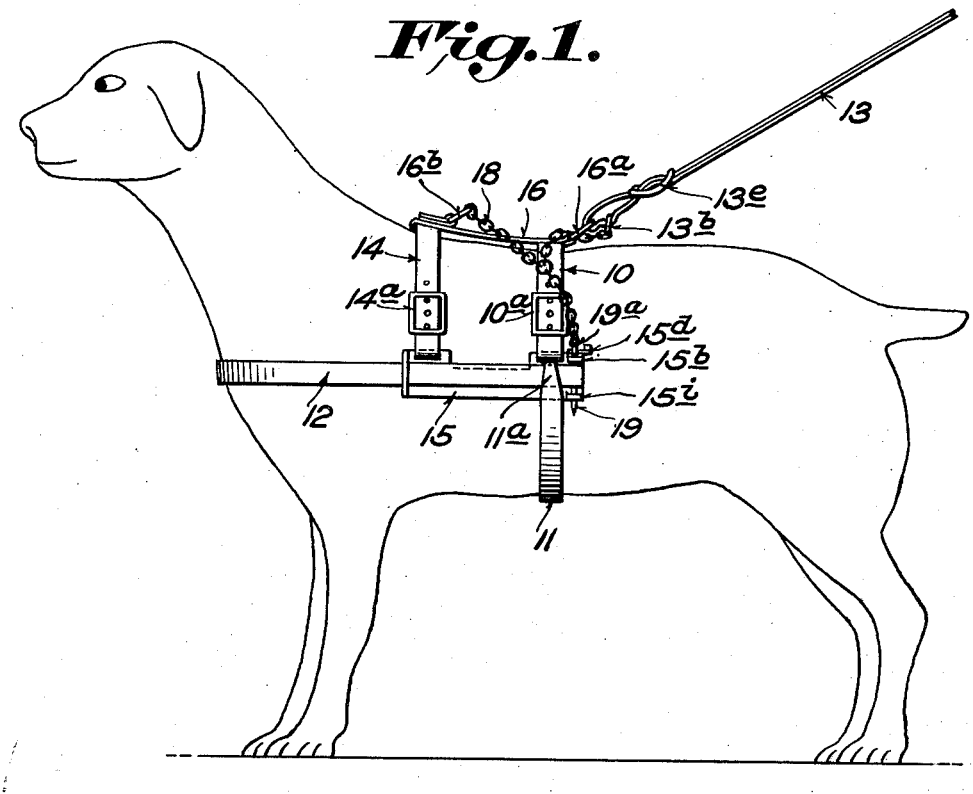
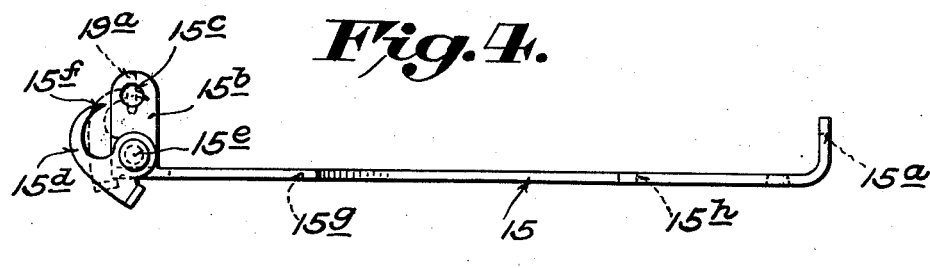
Inventor
Fred L. Clayton,
By Stowell & Evans
ATTORNEYS May 29, 1951 F. L. CLAYTON 2,555,027
QUICK RELEASE ANIMAL HARNESS
Filed Oct. 11, 1948 2 Sheets-Sheet 2
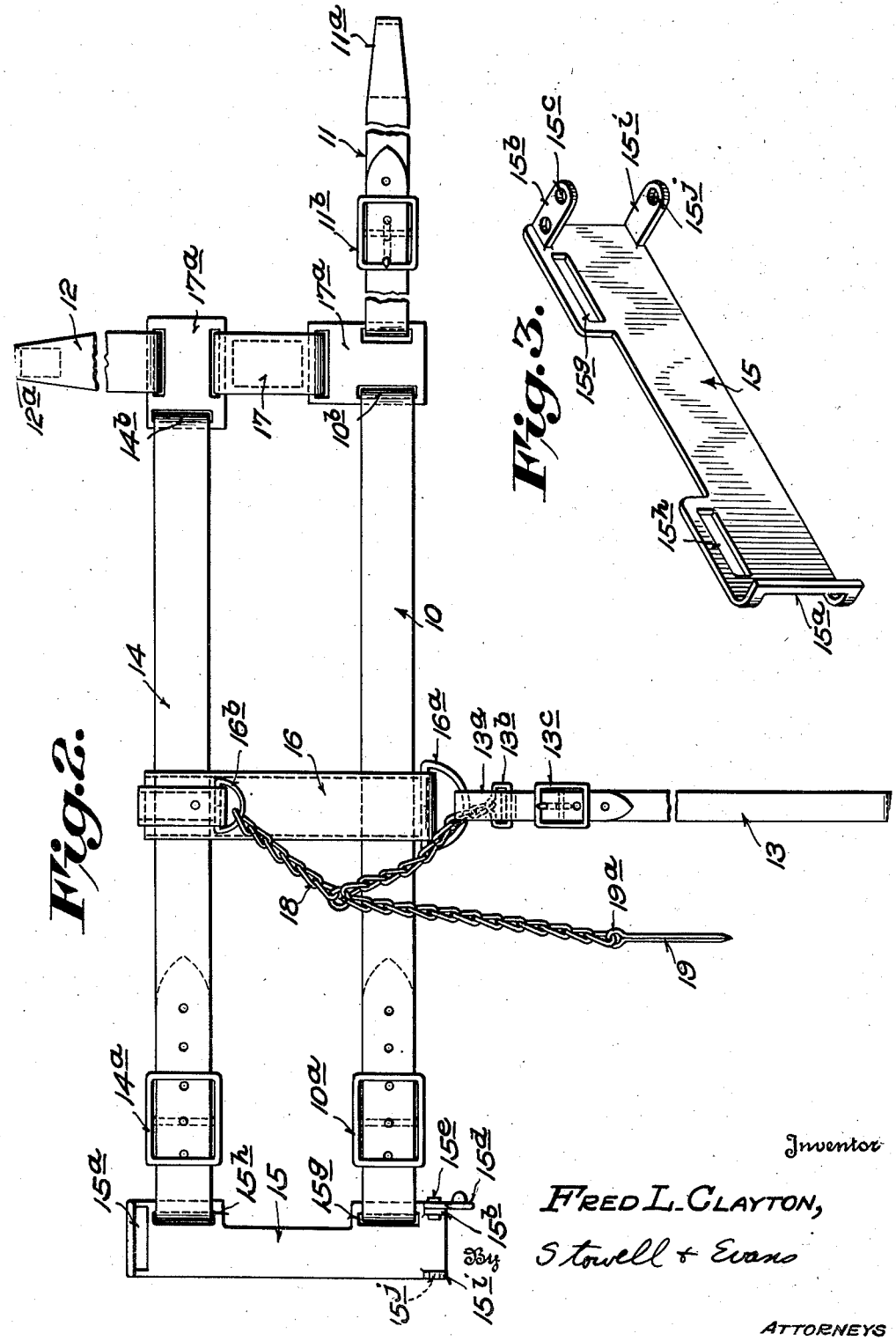
Inventor
Fred L. Clayton,
By Stowell & Evans
ATTORNEYS Patented May 29, 1951

2,555,027

UNITED STATES PATENT OFFICE 2,555,027

QUICK RELEASE ANIMAL HARNESS

Fred L. Clayton, Washington, D. C.

Application October 11, 1948, Serial No. 53,973

4 Claims. (Cl. 119—96)

This invention relates to a quick release harness for animals, particularly for dogs, whereby the harness may be quickly, and completely removed from the dog by tension applied to the harness leash giving immediate freedom to the animal.

It is an object of the invention to provide a quick release harness that will be light in weight and hold the animal securely without restricting its movements.

Another object of the invention is to provide a harness that can be readily adjusted as to size and that can be put on and taken off without disturbing this size adjustment.

A further object is to provide an animal harness with a quick release mechanism which is inexpensive to construct and simple as to its parts.

Another object of the invention is to provide a quick release mechanism for a harness that may be positively locked to insure against premature release.

These and other objects and advantages are attained by the quick release harness of the invention which includes a saddle, a leash attached to the saddle, a breastband and a bellyband each attached at one end to the saddle, and strap retaining means retractable by tension on the leash for connecting the unattached end of one of the bands to the saddle which band in turn retains the unattached end of the other band whereby upon release of the one band the other band is also released.

The invention will be more particularly described with reference to the illustrative embodiment of the invention shown in the accompanying drawings, in which:

Fig. 1 is a side view of a quick release harness embodying the principles of the invention in place on a dog;

Fig. 2 is an enlarged fragmentary plan view of the harness;

Fig. 3 is a perspective view of the quick release latch plate; and

Fig. 4 is an enlarged side view of the quick release latch plate.

Referring particularly to Fig. 2 of the drawings the preferred form of the harness embodying the principles of the invention includes a saddle 10, bellyband 11, breastband 12, leash 13, neck strap 14, side latch plate 15, back strap 16, connecting link 17, releasing mechanism 18, and locking pin 19.

Saddle 10 and neck strap 14 are connected together at three points. At one end they are connected to side connecting link 17 by loops 10b and 14b formed in the ends of the saddle and neck strap respectively. These loops pass through slots in link plates 17a. The loops 10b and 14b are fastened by means well known in the art such as riveting, sewing or gluing. Back strap 16 is the center connecting link while side latch plate 15 connects the saddle and neck strap at the other end. The saddle and neck strap are joined, through slots 15g and 15h in latch plate 15, by buckled loops. These buckles are designated 10a and 14a and provide a means for adjusting the saddle and neck strap to various sized animals.

Bellyband 11 is joined to the saddle through side link plate 17a by a similar buckle arrangement 11b which provides the means of adjusting the length of the band. In the unattached end of bellyband 11 a loop 11a is formed. This loop is large enough to receive the breastband 12 which is also connected at one end to the side link 17a in the same manner as the bellyband. The buckle provided for adjustment of the breastband is not shown. In the unattached end of band 12 there is a loop 12a large enough to receive locking pin 19.

The side latching plate 15 as shown particularly in Figs. 3 and 4 is provided with three slots 15a, 15g, and 15h. Slots 15g and 15h as hereinbefore described receive the adjusting and fastening loops of the saddle and neck strap. Depending slot 15a receives the unattached end of breastband 12. This breastband 12 passes through the slot 15a and extends the length of the latch plate so that the pin receiving loop 12a lies between the two flanged pin engaging elements 15b and 15f.

Element 15b is provided with a lock pin receiving hole 15c, and a pin locking device 15d which is pivotally mounted at 15e. This locking device has a pin engaging point 15f at its uppermost end which passes through the eye of strap retaining pin 19. The releasing mechanism 18 is connected to the pin at this eye and to the saddle by link ring 16b.

Leash 13 is connected to ring 16a of the harness by an adjustable loop 13a. The buckle 13c provides the adjusting means. Locking pin 19 is linked to ring 13a of the leash by the pin extracting chain assembly 18.

The harness is adjusted by the harness buckles on the saddle, neck strap, bellyband, breastband, and leash and placed on the dog as shown in Fig. 1 with the back strap 16 centered on the animal's back allowing the saddle 10 and neck strap 14 to partly encircle its body. Next the unattached end of the breastband is brought around the animal's chest and through the breastband retaining slot 15a of latch plate 15. The unattached end of bellyband 11 is brought under the belly and held secure against the latch plate by passing the still unattached end of the breastband through the looped end 11a of bellyband 11. Next the strap retaining pin 19 is inserted through hole 15c of pin engaging element 15b, loop 12a of breastband 12, and hole 15j of pin engaging element 15i. Thus the harness is securely fastened to the dog.

With the latch pin 19 in place on the latch plate 15 loop 13a of leash 13 is in a forward position relative to leash retaining ring 16a, and all tension upon the leash pulls directly upon the pin, through the pin extracting chain assembly 18, until a force is exerted that will remove the pin from the latch plate 15. As the pin is being extracted loop 13a of the leash is moved rearwardly relative to the leash retaining ring 16a. When the pin has been entirely retracted all tension upon the leash 13 is transmitted directly to the harness through leash ring 16a which is now in contact with the end of the leash loop. With the strap retaining pin 19 removed from latch plate 15 and breastband loop 12a continued tension acts directly upon the harness and lifts it from the back of the animal removing the breastband from loop 11a of the bellyband and freeing the dog from the harness.

When the master of the animal does not wish to have the quick release mechanism of the harness in operation, pin locking device 15d is rotated until the pin engaging point 15j has passed through eye 19a of the locking pin, preventing the retroaction of the pin by tension upon the leash.

From the foregoing description it will be seen that the present invention provides a quick release harness that is simple to operate, light in weight, inexpensive to manufacture, and having the further desirable quality of being readily locked to insure against accidental release.

I claim:

1. A quick release harness, comprising a saddle and a neck strap, a side link and a top link connecting said neck strap and said saddle at the top and one side, and a latch plate connecting said neck strap and said saddle at the other side; a bellyband and a breastband each attached at one end to said side link; loop means at the other end of the bellyband securing said bellyband to the other end of the breastband, a loop carried by said latch plate adapted to receive said other end of the breastband; loop means at said other end of the breastband; means releasably securing said other end of the breastband to the latch plate comprising a keeper carried by the latch plate and a latch pin engaging the loop means on the other end of the breastband and the keeper; a leash ring secured to the top connecting link; a leash having a loop engaging said leash ring; and flexible draft means interconnecting said leash, said top connecting link and said latch pin through a star connection, the length of said interconnecting draft means being so selected that tension on the leash is transmitted to said latch pin when the latch pin is in engaged position.

2. A quick release harness, comprising a saddle and a neck strap, a side link and a top link connecting said neck strap and said saddle at the top and one side, and a latch plate connecting said neck strap and said saddle at the other side; a bellyband and a breastband each attached at one end to said side link; loop means at the other end of the bellyband securing said bellyband to the other end of the breastband, a loop carried by said latch plate adapted to receive said other end of the breastband; loop means at said other end of the breastband; means releasably securing said other end of the breastband to the latch plate comprising a keeper carried by the latch plate and a latch pin engaging the loop means on the other end of the breastband and the keeper; a leash ring secured to the top connecting link; a leash having a loop engaging said leash ring; flexible draft means interconnecting said leash loop and said latch pin, the length of said interconnecting draft means being so selected that tension on the leash is transmitted to said latch pin when the latch pin is in engaged position; and guide means attached to said top connecting link for said flexible draft means adapted to direct the tension of the draft means on the latch pin in a direction to disengage said latch pin, said guide means comprising a flexible link between said top link and said draft means.

3. A quick release harness, comprising a saddle and a neck strap, a side link and a top link connecting said neck strap and said saddle at the top and one side, and a latch plate connecting said neck strap and said saddle at the other side; a bellyband and a breastband each attached at one end to said side link; loop means at the other end of the bellyband securing said bellyband to the other end of the breastband, a loop carried by said latch plate adapted to receive said other end of the breastband; loop means at said other end of the breastband; means releasably securing said other end of the breastband to the latch plate comprising a keeper carried by the latch plate and a latch pin engaging the loop means on the other end of the breastband and the keeper; a leash ring secured to the top connecting link; a leash having a loop engaging said leash ring; flexible draft means interconnecting said leash loop and said latch pin, the length of said interconnecting draft means being so selected that tension on the leash is transmitted to said latch pin when the latch pin is in engaged position; and guide means attached to said top connecting link for said flexible draft means adapted to direct the tension of the draft means on the latch pin in a direction to disengage said latch pin.

4. A quick release harness, comprising a saddle, a breastband and a bellyband each attached at one end to one end of the saddle; a latch plate attached to the other end of the saddle; loop means at the other end of the bellyband securing said bellyband to the other end of the breastband; a loop carried by said latch plate adapted to receive said other end of the breastband; means releasably securing said other end of the breastband to the latch plate comprising a keeper carried by the latch plate and a latch pin engaging the loop means on the other end of the breastband and the keeper; a leash ring secured to the top of the saddle; a leash having a loop engaging said leash ring; flexible draft means interconnecting said leash loop and said latch pin, the length of said interconnecting draft means being so selected that tension on the leash is transmitted to said latch pin when the latch pin is in engaged position; and guide means attached to said saddle for said flexible draft means adapted to direct the tension of the draft means on the latch pin in a direction to disengage said latch pin, said guide means comprising a flexible link between said saddle and said draft means.

FRED L. CLAYTON.

REFERENCES CITED

The following references are of record in the file of this patent:

UNITED STATES PATENTS

| Number | Name | Date |
|---|---|---|
| 98,147 | Chesnut | Dec. 21, 1869 |
| 527,994 | Kennedy | Oct. 23, 1894 |
| 794,563 | Stahlkneckt | July 11, 1905 |

FOREIGN PATENTS

| Number | Country | Date |
|---|---|---|
| 521,358 | Great Britain | May 10, 1940 |